United States Patent [19]

Angi et al.

[11] 4,329,605
[45] May 11, 1982

[54] ELECTRIC MOTOR HAVING RADIO FREQUENCY INTERFERENCE RADIATION SUPPRESSION

[75] Inventors: Donald F. Angi, Dayton; William D. Cornwell, Jr., Kettering, both of Ohio

[73] Assignee: General Motors Corporation, Detroit, Mich.

[21] Appl. No.: 196,355

[22] Filed: Oct. 14, 1980

[51] Int. Cl.³ .............................................. H02K 11/00
[52] U.S. Cl. .................................... 310/68 R; 310/72; 310/239; 310/249; 307/105; 361/2
[58] Field of Search ................. 310/68 R, 72, 220, 51, 310/221, 71, 81, 239–242, 244–249, DIG. 6; 307/105; 361/2, 13

[56] References Cited

U.S. PATENT DOCUMENTS

| | | | |
|---|---|---|---|
| 2,165,886 | 7/1939 | Daniel | 307/105 |
| 3,238,434 | 3/1966 | Blitz et al. | 310/68 R |
| 3,594,598 | 7/1971 | Schaub | 310/220 |
| 3,924,147 | 12/1975 | Tarnow et al. | 310/68 |

FOREIGN PATENT DOCUMENTS 215207  9/1941  Switzerland ..................... 307/107

Primary Examiner—R. Skudy
Attorney, Agent, or Firm—Richard G. Stahr

[57] ABSTRACT

Two spaced capacitors are connected in parallel across each supply lead of a brush-commutator type electric motor and the motor frame to provide a PI filter for each brush in which the length of brush lead between the capacitors comprises the inductor element of the filter. To facilitate this arrangement, one of the capacitors for each brush is mounted upon one side of an annular support member of an insulating material and an electrically conductive plate arranged to electrically engage the motor frame upon assembly is mounted upon the other side with electrical connections extending through the support member to interconnect one terminal end of each of the capacitors to the conductive plate and to secure the conductive plate to the support member.

3 Claims, 6 Drawing Figures

ELECTRIC MOTOR HAVING RADIO FREQUENCY INTERFERENCE RADIATION SUPPRESSION

This invention is directed to brush and commutator type electrical motors and, more specifically, to motors of this type having a radio frequency interference radiation suppressing PI filter for each brush.

It is becoming increasingly important that the brush-commutator generated radio frequency interference of an electric motor be suppressed to a low level at which any detrimental effect that this interference may have on surrounding electronic equipment is minimized or eliminated. A radio frequency interference radiation suppressing arrangement that is effective, that is of low cost and that is of simple manufacture, therefore, is desirable.

It is, therefore, an object of this invention to provide an improved arrangement for suppressing the radiation of electric motor brush-commutator generated radio frequency interference energy.

It is another object of this invention to provide an improved arrangement for suppressing the radiation of electric motor brush-commutator generated radio frequency interference energy comprising a PI filter for each brush of a brush-commutator type electric motor.

In accordance with this invention, there is provided an electric motor having a PI filter for each brush that is comprised of two spaced capacitors connected in parallel across each brush lead and the motor frame for suppressing the radiation of brush-commutator generated radio frequency interference energy.

For a better understanding of the present invention, together with additional objects, advantages and features thereof, reference is made to the following description and accompanying drawing in which.

In an actual embodiment, a direct current electric motor of the brush-commutator type that is employed to drive the windshield wipers of a motor vehicle is equipped with the radio frequency interference radiation suppressing arrangement of this invention. As these motors are grounded to the vehicle frame in vehicle applications, the motor frame ground is represented by the accepted schematic symbol and referenced by the numeral 5 in FIG. 6.

Figure 1:
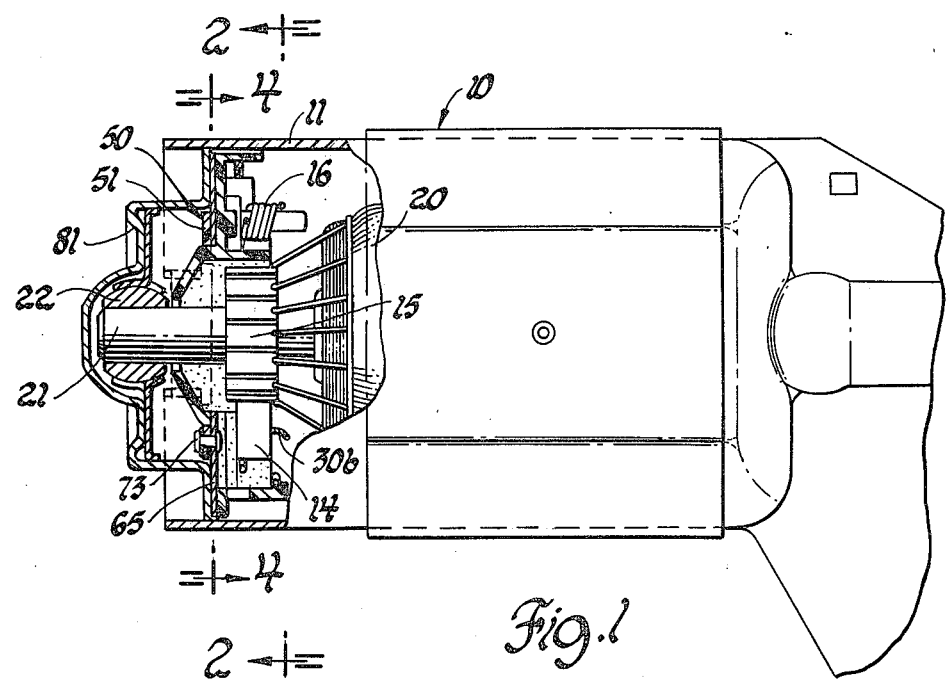
FIG. 1 is an elevation view in partial section of an electric motor in which the radio frequency interference radiation suppressing arrangement of this invention is installed.
Figure 2:
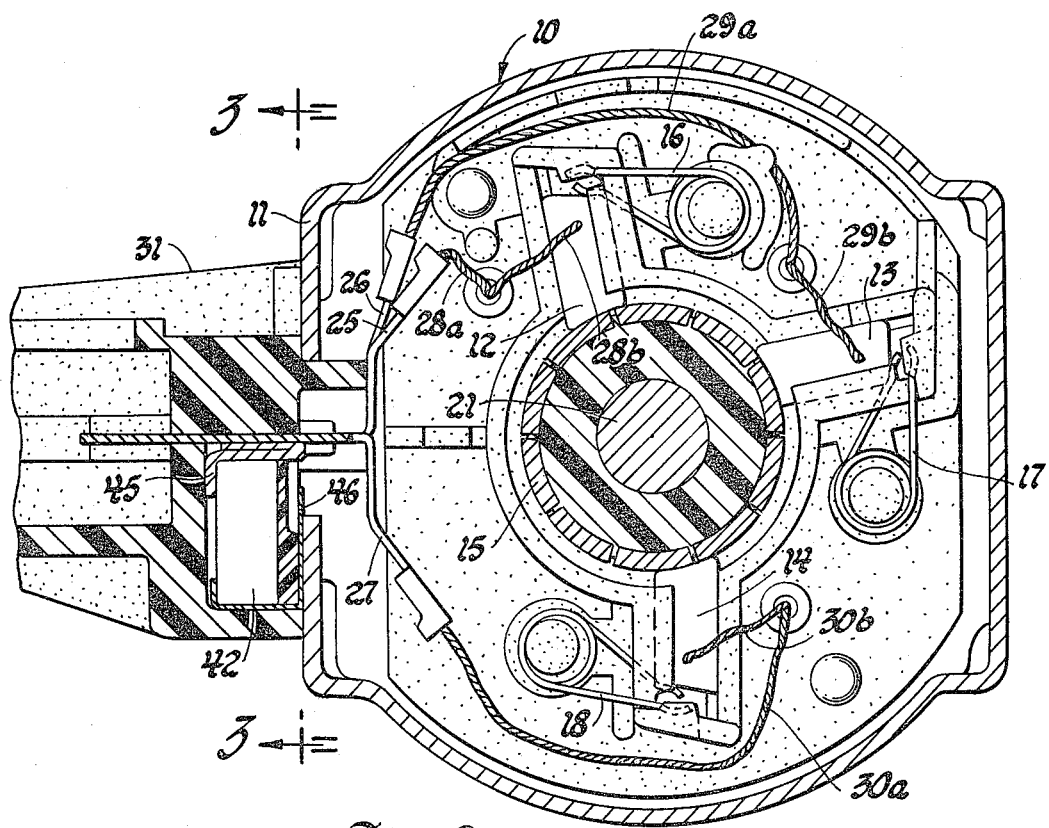
FIG. 2 is a section view of FIG. 1 taken along line 2—2 and looking in the direction of the arrows.

FIG. 1 of the drawing is an elevation view in partial section of a brush-commutator type electric motor 10 in which the radio frequency interference radiation suppressing arrangement of this invention is installed for suppressing the radiation of the brush-commutator generated radio frequency interference energy. Motor 10 is illustrated to be of the two speed direct current type having, as best seen in FIG. 2, a low speed positive polarity brush 12, a high speed positive polarity brush 13, a negative polarity brush 14 and a conventional barrel type commutator 15. As is well known in the electric motor art, brushes 12, 13 and 14 are forced into sliding engagement with the segments of commutator 15 by respective torsion springs 16, 17 and 18. Also as is well known in the art, the armature 20 is supported by a shaft 21 that is journaled in accommodating bearings, one of which is shown in FIG. 1 and referenced at 22.

Figure 3:
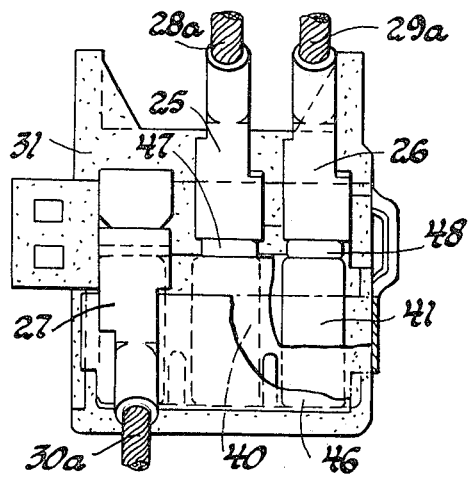
FIG. 3 is a section view of FIG. 2 taken along line 3—3 and looking in the direction of the arrows.
Figure 6:
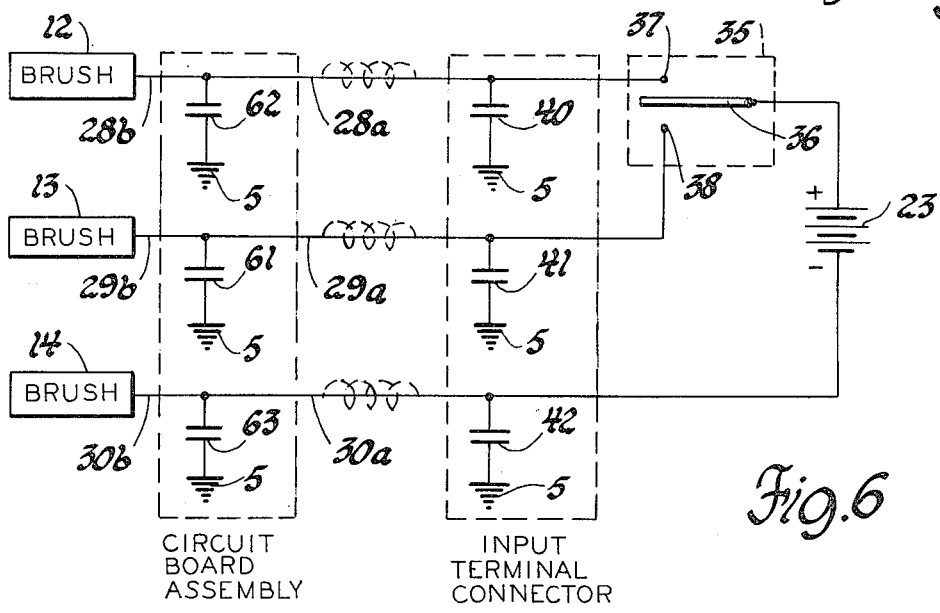
FIG. 6 is a schematic diagram of the radio frequency interference radiation suppressing arrangement of this invention.

Low speed positive polarity brush 12, high speed positive polarity brush 13 and negative polarity brush 14 are arranged for connection across a supply potential source such as a conventional storage type battery 23, FIG. 6, through respective input terminals 25, 26 and 27, FIGS. 2 and 3, and respective brush leads 28a–28b, 29a–29b and 30a–30b. As is well known in the electric motor art, each of input terminals 25, 26 and 27 is made of a conductive material and may be of one piece construction. These input terminals may be supported by an input terminal connector 31 of an insulating material. This is best seen with regard to input terminal 27 of FIG. 2. The supply potential source may be a conventional storage type battery 23, FIG. 6, that is connectable to motor 10 through a conventional electrical switch 35 that may be of the single pole double throw center position "Off" type well known in the art having a movable contact 36 and two stationary contacts 37 and 38. With movable contact 36 operated into electrical circuit closing engagement with stationary contact 37, the positive and negative polarity output terminals of battery 23 are connected across low speed positive polarity brush 12 and negative polarity brush 14, respectively, to energize motor 10 for operation in the low speed mode. With movable contact 36 operated into electrical circuit closing engagement with stationary contact 38, the positive and negative polarity output terminals of battery 23 are connected across the high speed positive polarity brush 13 and negative polarity brush 14, respectively, to energize motor 10 for operation in the high speed mode.

Two capacitors are provided for each of brushes 12, 13 and 14. Three of these capacitors, one for each of the brushes, are mounted within an accommodating chamber of input terminal connector 31. The capacitor of these three corresponding to low speed positive polarity brush 12 is referenced by the numeral 40 in FIG. 3, the capacitor of these three corresponding to high speed positive polarity brush 13 is referenced by the numeral 41 in FIG. 3 and the capacitor of these three corresponding to negative polarity brush 14 is referenced by the numeral 42 in FIG. 2. Each of these capacitors is of the foil wrapped type that are commercially marketed by Gulf and Western Industries of Union Springs, N.Y. under the designation part No. 84051128. Referring to FIG. 2, capacitor 42 for negative polarity brush 14 is connected across brush lead 30a and the frame 11 of motor 10 through input terminal 27, an individual conductive clip 45 made up of a conductive material and formed and positioned to be in electrical engagement with one terminal end of capacitor 42 and input terminal 27 and through another conductive member 46 that is in electrical circuit engagement with the other terminal end of capacitor 42 and the frame 11 of motor 10 while input terminal connector 31 is assembled to motor 10. Capacitor 40 for low speed positive polarity brush 12 is connected across brush lead 28a and the frame 11 of motor 10 through input terminal 25, an individual conductive clip 47, best seen in FIG. 3, made up of a conductive material and formed and positioned to be in electrical engagement with one terminal end of capacitor 40 and input terminal 25 and through conductive member 46 and capacitor 41 for high speed positive polarity brush 13 is connected across brush lead 29a and the frame 11 of motor 10 through input terminal 26, an individual conductive clip 48, best seen in FIG. 3, made up of a conductive material and formed and positioned to be in electrical engagement with one terminal end of capacitor 41 and input terminal 26 and through conductive member 46. These connections are identical to those for capacitor 42 hereinabove described. In the actual embodiment, conductive member 46 is a sheet of conductive foil arranged to be electrically connected to the terminal end of each of capacitors 40, 41 and 42 opposite the end connected to respective conductive clips 47, 48 and 45 and is folded around the outside of these capacitors in such a manner that it is in electrical engagement with the frame 11 of motor 10 when input terminal connector 31 is assembled to motor 10. Also in the actual embodiment, capacitors 40, 41 and 42 are potted within the accommodating chamber of input terminal connector 31. In FIG. 3, conductive member 46 is shown broken away so that capacitors 40 and 41 may be better illustrated. In the actual embodiment, these capacitors have a capacitance value of 0.22 microfarads. The other three of these capacitors, one for each of the brushes, are accommodated by a circuit board assembly 50 illustrated in FIG. 5. This circuit board assembly is comprised of an annular support member 51 of an electrical insulating material having a printed circuit conductor pair 52–53, 54–55 and 56–57 for each of the other three capacitors 61, 62 and 63, respectively, located on one side thereof. In the actual embodiment, capacitors 61, 62 and 63 are of the ceramic chip type commercially marketed by AVX Capacitor Co. of San Diego, Calif. under the designation part No. ULA55-5E224Z1. Capacitors of this type have conductive areas on each terminal end thereof which may be solder connected to an external lead. The conductive terminal ends of capacitor 61 are solder connected to respective ones of printed circuit conductor pair 52–53, the conductive terminal ends of capacitor 62 are solder connected to respective ones of printed circuit conductor pair 54–55 and the conductive terminal ends of capacitor 63 are solder connected to respective ones of printed circuit conductor pair 56–57. In the actual embodiment, these capacitors have a capacitance value of 0.22 microfarads.

Located on the opposite side of annular support member 51 is a plate 65 of an electrically conductive material such as stainless steel. Respective conductive rivets 71, 72 and 73 extend through annular support member 51 and electrically conductive plate 65 for providing an electrical connection between a selected one printed circuit conductor of each printed circuit conductor pair and electrically conductive plate 65 and for securing electrically conductive plate 65 to annular support member 51. Therefore, conductive rivet 71 connects printed circuit conductor 52 of printed circuit conductor pair 52–53 to electrically conductive plate 65, conductive rivet 72 connects printed circuit conductor 54 of printed circuit conductor pair 54–55 to electrically conductive plate 65 and conductive rivet 73 connects printed circuit conductor 56 of printed circuit conductor pair 56–57 to electrically conductive plate 65. In the drawings, these conductive rivets are illustrated to be of the hollow type, however, conductive rivets of any type may be employed without departing from the spirit of the invention. Electrically connected to the other printed circuit conductor of each printed circuit conductor pair are respective conductive pins 75, 76 and 77. That is, conductive pin 75 is electrically connected to printed circuit conductor 53, conductive pin 76 is electrically connected to printed circuit conductor 55 and conductive pin 77 is electrically connected to printed circuit conductor 57. Each of these conductive pins may be electrically connected to the corresponding printed circuit conductor by soldering such as shown at 75a, 76a and 77a. Each of the conductive pins 75, 76 and 77 extend through annular support member 51 and accommodating holes in electrically conductive plate 65 that are of large enough diameter as to not provide an electrical connection between any of the conductive pins and electrically conductive plate 65. In the actual embodiment, conductive pins 75, 76 and 77 are marketed by AMP, Incorporated of Harrisburg, Penna. under the designation No. 60803-2.

Figure 5:
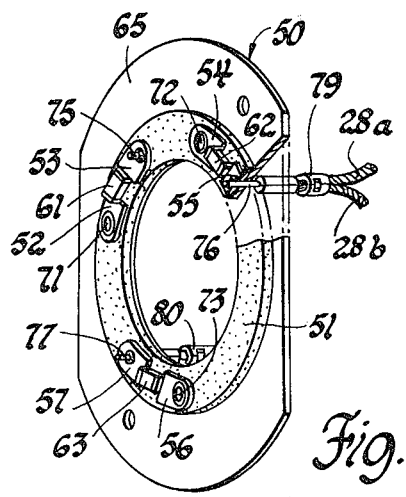
FIG. 5 is a perspective view of an annular support member of an insulating material upon which is mounted three ceramic chip type capacitors and a conductive plate.
Figure 4:
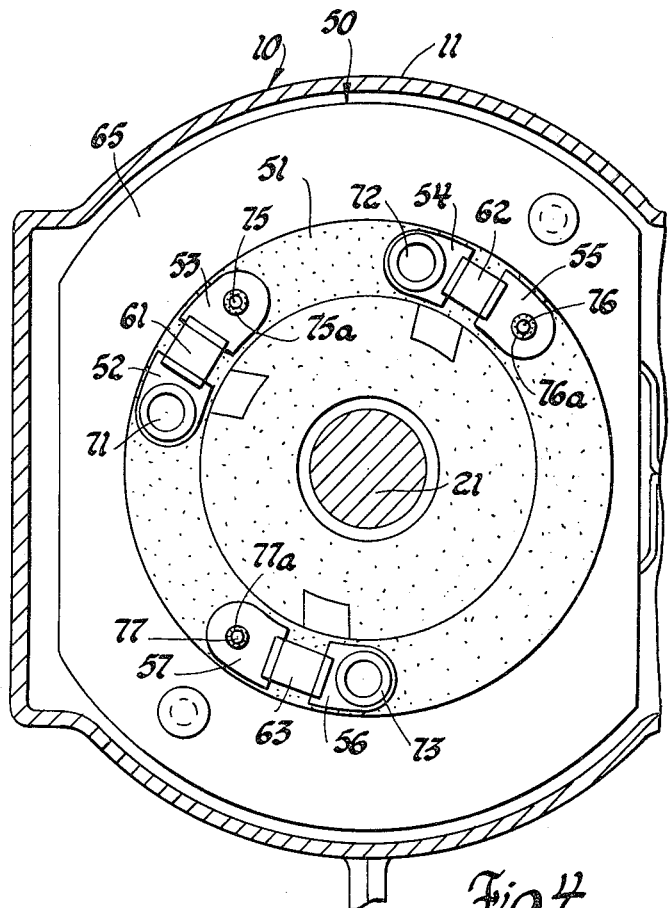
FIG. 4 is another section view of FIG. 1 taken along line 4—4 and looking in the direction of the arrows.

To connect one of the printed circuit conductors of each printed circuit conductor pair to a respective brush lead, brush leads 28a–28b for low speed positive polarity brush 12 are connected to conductive pin 76, brush leads 29a–29b for high speed positive polarity brush 13 are connected to conductive pin 75 and brush leads 30a–30b for negative polarity brush 14 are connected to conductive pin 77. As is best seen in FIG. 5, brush leads 28a–28b for low speed positive polarity brush 12 are connected together in a receptacle 79 that is arranged to engage conductive pin 76 in intimate electrical contact. Brush leads 29a–29b for high speed positive polarity brush 13 are similarly connected together in an identical receptacle, not shown, that is arranged to engage conductive pin 75 in intimate electrical contact and brush leads 30a–30b for negative polarity brush 14 are similarly connected together in an identical receptacle 80 that is arranged to engage conductive pin 77 in intimate electrical contact. In the actual embodiment, the receptacles 79 and 80 and the receptacle not shown for brush lead 29a–29b are marketed by AMP, Incorporated of Harrisburg, Penna. under the designation No. 60789-1. With these connections, capacitor 61 is connected across the brush lead 29a–29b for high speed positive polarity brush 13 and electrically conductive plate 65 through a receptacle that is not shown, conductive pin 75, printed circuit conductor 53, capacitor 61, printed circuit conductor 52 and conductive rivet 71; capacitor 62 is connected across the brush lead 28a–28b for low speed positive polarity brush 12 and electrically conductive plate 65 through receptacle 79, conductive pin 76, printed circuit conductor 55, capacitor 62, printed circuit conductor 54 and conductive rivet 72 and capacitor 63 is connected across brush lead 30a–30b for negative polarity brush 14 and electrically conductive plate 65 through receptacle 80, conductive pin 77, printed circuit conductor 57, capacitor 63, printed circuit conductor 56 and conductive rivet 73. As is best seen in FIG. 1, upon the assembly of motor 10, electrically conductive plate 65 is maintained in intimate electrical contact with the end housing 81 of motor 10 that is also in electrical contact with frame 11. Consequently, each of capacitors 61, 62 and 63 is connected across the respective brush lead and the frame 11 of motor 10.

With the connections for capacitors 40, 41 and 42 and capacitors 61, 62 and 63 as hereinabove explained, the two capacitors corresponding to each brush lead are connected across the brush lead for the corresponding brush and the motor frame with a selected length of brush lead therebetween. That is, capacitors 40 and 62 corresponding to low speed positive polarity brush 12 are connected in parallel across brush lead 28a and the motor frame with a selected length of brush lead therebetween to provide a PI filter for low speed positive polarity brush 12; capacitors 41 and 61 corresponding to high speed positive polarity brush 13 are connected in parallel across brush lead 29a and the motor frame with a selected length of the brush lead therebetween to provide a PI filter for high speed positive polarity brush 13 and capacitors 42 and 63 corresponding to negative polarity brush 14 are connected in parallel across brush lead 30a and the motor frame with a selected length of brush lead therebetween to provide a PI filter for negative polarity brush 14. As is best illustrated in the schematic diagram of FIG. 6, the brush leads 28a, 29a and 30a comprise the inductor element of each parallel capacitor PI filter. In FIG. 6, this inductor element is indicated as a dashed line coil for each of these brush leads.

It has been found that with these PI filters corresponding to each brush of motor 10, the radio frequency interference radiation is substantially reduced as indicated by the following chart that sets forth radiated energy in decibel microvolts:

| Wavelength Band | AM | | FM | | CB | |
|---|---|---|---|---|---|---|
| Motor Speed | Hi | Lo | Hi | Lo | Hi | Lo |
| Capacitors 40, 41 & 42 only | 58.04 | 59.16 | 39.81 | 35.35 | 30.14 | 23.97 |
| Capacitors 61, 62 & 63 only | 51.41 | 52.08 | 50.47 | 46.10 | 39.53 | 36.70 |
| PI Filter Arrangement | 48.80 | 52.17 | 30.93 | 26.75 | 17.68 | 16.08 |

While a preferred embodiment of the present invention has been shown and described, it will be obvious to those skilled in the art that various modifications and substitutions may be made without departing from the spirit of the invention that is to be limited only within the scope of the appended claims.

The embodiments of the invention in which an exclusive property or privilege is claimed are defined as follows:

1. In an electric motor of the type having a commutator and brushes arranged for connection across a supply potential source through respective brush leads, an arrangement for suppressing the radiation of the brush-commutator generated radio frequency interference energy by providing a PI filter for each brush comprising: a first capacitor and a second capacitor for each said brush; a support member of an electrical insulating material effective to support a printed circuit conductor pair for each of said first capacitors and a conducting means on respective opposite sides thereof; means for connecting each said first capacitor across a respective one said printed circuit conductor pair; means extending through said support member for connecting a selected one conductor of each said printed circuit conductor pair to said conducting means; means for connecting the other one conductor of each said printed circuit conductor pair to a respective said brush lead whereby the corresponding said capacitor is connected across said brush lead and said conducting means; means for electrically connecting said conducting means to the frame of said motor; and means for connecting each said second capacitor between a respective said brush lead and the frame of said motor in such a manner that there is a selected length of said brush lead between said first and second capacitors that comprises the inductor element of a parallel capacitor PI filter.

2. In an electric motor of the type having a commutator and brushes arranged for connection across a supply potential source through respective brush leads, an arrangement for suppressing the radiation of the brush-commutator generated radio frequency interference energy by providing a PI filter for each brush comprising: a first capacitor and a second capacitor for each said brush; a support member of an electrical insulating material effective to support a printed circuit conductor pair for each of said first capacitors and a conducting metal plate on respective opposite sides thereof; means for connecting each said first capacitor across a respective one said printed circuit conductor pair; means extending through said support member for connecting a selected one conductor of each said printed circuit conductor pair to said conducting metal plate; means for connecting the other one conductor of each said printed circuit conductor pair to a respective said brush lead whereby the corresponding said capacitor is connected across said brush lead and said conducting metal plate; said conducting metal plate engaging housing means of said motor plate of electrically conductive material; and means for connecting each said second capacitor between a respective said brush lead and the frame of said motor in such a manner that there is a selected length of said brush lead between said first and second capacitors that comprises the inductor element of a parallel capacitor PI filter.

3. In an electric motor of the type having a commutator and brushes arranged for connection across a supply potential source through respective brush leads, an arrangement for suppressing the radiation of the brush-commutator generated radio frequency interference energy by providing a PI filter for each brush comprising: a first capacitor and a second capacitor for each said brush; an annular support member of an electrical insulating material; a printed circuit conductor pair for each of said first capacitors located on one side of said annular support member; a plate of electrically conductive material located upon the opposite side of said annular support member; means for connecting each said first capacitor across a respective one said printed circuit conductor pair; means extending through said annular support member and said plate of electrically conductive material for connecting a selected one conductor of each said printed circuit conductor pair to said plate of electrically conductive material and for securing said plate of electrically conductive material to said annular support member; means for connecting the other one conductor of each said printed circuit conductor pair to a respective said brush lead whereby the corresponding said capacitor is connected across said brush lead and said plate of electrically conductive material; means for electrically connecting said plate of electrically conductive material to the frame of said motor; and means for connecting each said second capacitor between a respective said brush lead and the frame of said motor in such a manner that there is a selected length of said brush lead between said first and second capacitors that comprises the inductor element of a parallel capacitor PI filter.

* * * * *